United States Patent [19]
Sakamoto

[11] 3,872,857
[45] Mar. 25, 1975

[54] INSTRUMENT FOR TAKING IMPRESSIONS OF NASAL SEPTUMS

[76] Inventor: Minoru Sakamoto, 3911 Nioi Pl., Honolulu, Hawaii 96816

[22] Filed: May 9, 1973

[21] Appl. No.: 359,211

[52] U.S. Cl............... 128/2 S, 33/143 C, 33/174 D
[51] Int. Cl............................................... A61b 5/10
[58] Field of Search........... 128/2 S, 2 R; 33/143 C, 33/143 R, 174 P; 32/17; 264/222

[56] References Cited
UNITED STATES PATENTS

| | | | |
|---|---|---|---|
| 1,679,748 | 8/1928 | Stratton | 33/174 X |
| 2,299,285 | 10/1942 | Taylor, Jr. | 32/17 |
| 2,330,978 | 10/1943 | Klein | 128/2 S |
| 2,535,163 | 12/1950 | Scott | 33/174 D |
| 2,550,869 | 5/1951 | Salisbury | 32/17 X |
| 2,567,794 | 9/1951 | Winett | 32/17 X |
| 3,165,782 | 1/1965 | Gardner | 264/222 X |

FOREIGN PATENTS OR APPLICATIONS
254,003   3/1971   U.S.S.R. ............................... 128/2 S

*Primary Examiner*—Kyle L. Howell
*Attorney, Agent, or Firm*—Clarence A. O'Brien; Harvey B. Jacobson

[57] ABSTRACT

An instrument in the form of a caliper device having parallel portions arranged for bracketing an object. One of a pair of elements forming the parallel portions is movable with respect to the other element as by a worm screw rack assembly to adjust the bracketing portions to a particular object. In particular, the bracketing portions are adjusted to a nasal septum and function to measure the septum for a nasal filter. Attachments to the bracketing portions retain an impressionable material for imprinting an impression of a nasal septum in the material. This imprint is used in forming a nasal filter, and the like.

4 Claims, 10 Drawing Figures

3,872,857
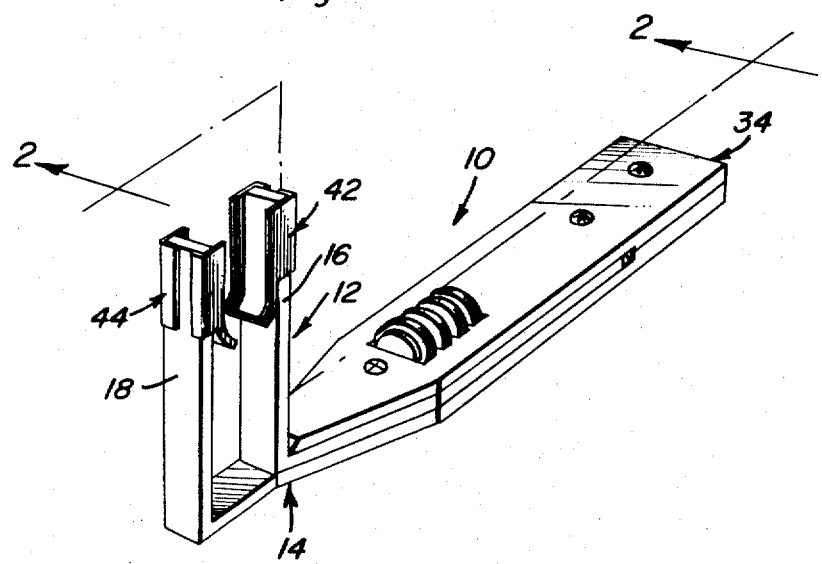
Fig. 1
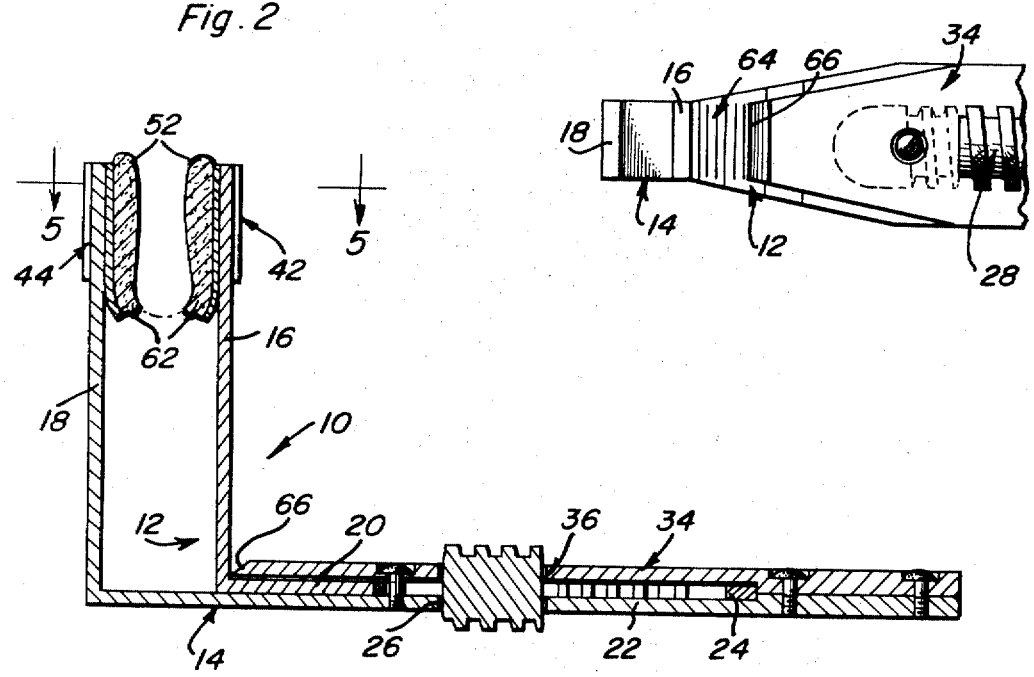
Fig. 2
Fig. 3

INSTRUMENT FOR TAKING IMPRESSIONS OF NASAL SEPTUMS

BACKGROUND OF THE INVENTION

1. Field of the Invention

This invention relates generally to an instrument for measuring and taking an impression of an object, and particularly to measuring and taking impressions of nasal septums.

2. Description of the Prior Art

Application Ser. No. 287,259, now U.S. Pat. No. 3,802,426, filed Sept. 8, 1972, by myself, Minoru Sakamoto, discloses a nasal filter having a clip intended to fit over a nasal septum. In order to have a secure and comfortable fit of the clip on the septum, it is necessary that the clip be specially made for a specific wearer.

Instruments are known for making various measurements of a person's teeth and face. Examples of such devices are shown in U.S. Pat. Nos: 1,679,748, 1,726,193, and 2,535,163.

SUMMARY OF THE INVENTION

It is an object of the present invention to provide an instrument for measuring an extent of an object such as a nasal septum.

It is another object of the present invention to provide an instrument adapted for taking impressions of a nasal septum.

These and other objects are achieved according to the present invention by providing a nasal-septum measuring, caliper device, and impression taking attachments for such a device.

A preferred embodiment of a caliper device according to the present invention has a pair of elements provided with parallel portions in the form of jaws arranged for bracketing an object. One of these elements is movable with respect to the other element, and is adjusted by a worm in the form of a cylindrical member provided with screw threads that cooperate with racks arranged in an opening in the movable element to form a worm screw rack assembly. The movable element is advantageously arranged between the fixed element and a plate, an edge of the plate cooperating with a scale on the movable element to permit one to read-off an extent of an object being measured.

The impression-taking attachments each may have a pair of parallel walls and a web connected to and arranged extending between these walls and cooperating with same for forming a channel arranged for receiving an impressionable material, such as putty, and the like, therein. Flanges are provided on the attachment side walls, and are arranged extending parallel to the web and toward one another for embracing an element portion with which the attachment is associated. The web is advantageously provided with an extension curved in a plane parallel to the side walls of the attachment, while continuations of the side walls extend along the web extension. A lip is arranged between the side wall continuations adjacent the end of the web extension for forming a separator arrangeable at a lower portion of a nasal septum.

These together with other objects and advantages which will become subsequently apparent reside in the details of construction and operation as more fully hereinafter described and claimed. Reference being had to the accompanying drawings forming a part hereof, wherein like numerals refer to like parts throughout.

BRIEF DESCRIPTION OF THE DRAWINGS

FIG. 1 is a perspective view showing an embodiment of an instrument according to the present invention.

FIG. 2 is a sectional view, taken generally along the line 2—2 of FIG. 1.

FIG. 3 is a fragmentary, top plan view showing the instrument of FIGS. 1 and 2, but with impression-taking attachments removed.

DESCRIPTION OF THE PREFERRED EMBODIMENTS

Figure 5:
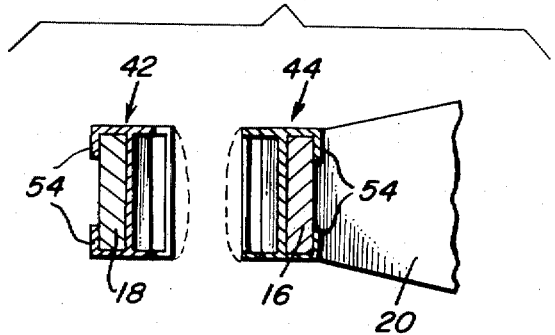
FIG. 5 is a fragmentary, sectional view, taken generally along the line 5—5 of FIG. 2, but with an impression-taking material shown in broken lines.

Referring now more particularly to FIGS. 1 to 4 of the drawings, an instrument according to the present invention in the form of a caliper device 10 has elements 12 and 14 provided with parallel portions 16 and 18 in the form of jaws arranged for bracketing an object, such as a nasal septum. By nasal septum is meant that portion of a human nose separating the nostrils. As can be readily appreciated from the drawings, portions 16 and 18 are planar and have a substantially rectangular cross-section.

Elements 12 and 14 are further provided with parallel parts 20 and 22 arranged extending perpendicularly and co-directionally from portions 16 and 18, respectively, and are themselves provided with openings 24 and 26 having straight opposed walls. Opening 26 is provided with a plurality of teeth along its opposed walls for a purpose to be brought out below. One of the elements 12, 14, element 12 in the embodiment illustrated in FIGS. 1 to 4 of the drawings, is movable with respect to the other element 14, 12. An arrangement including a cylindrical member 28 is provided for adjusting the spacing between portions 16 and 18. This arrangement includes in addition to cylindrical member 28, which is provided with screw threads and forms a worm, a plurality of teeth provided on the straight, opposed walls of opening 24 to form a pair of opposed racks 30 and 32. Member 28 and racks 30, 32 form a worm screw rack assembly arranged for moving part 20 of element 12 and, therefore, its associated portion 16, relative to part 22 and portion 18 of element 14 by rotation of cylindrical member 28.

A plate 34 provided with a toothed opening 36, similar to opening 26, permits part 20 of element 12 to be arranged between part 22 of element 14 and plate 34 to provide a guide for part 20 of element 12. Raised portions 38 and 40 of plate 34 and part 22, respectively, permit the formation of the part 20 guideway. Opening 24 in part 20 is elongated for permitting movement of element 12 with respect to element 14 and plate 34. The toothed openings 26 and 36 are arranged for retainingly receiving cylindrical member 28 and permitting it to rotate while restraining it in the housing formed by the outside elements. Suitable, known fasteners, such as illustrated screws, may be used to fasten plate 34 to part 22 of element 14.

Figure 6:
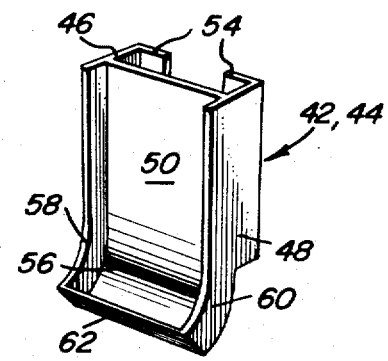
FIG. 6 is a perspective view showing an impression-taking attachment according to the present invention.
Figure 4:
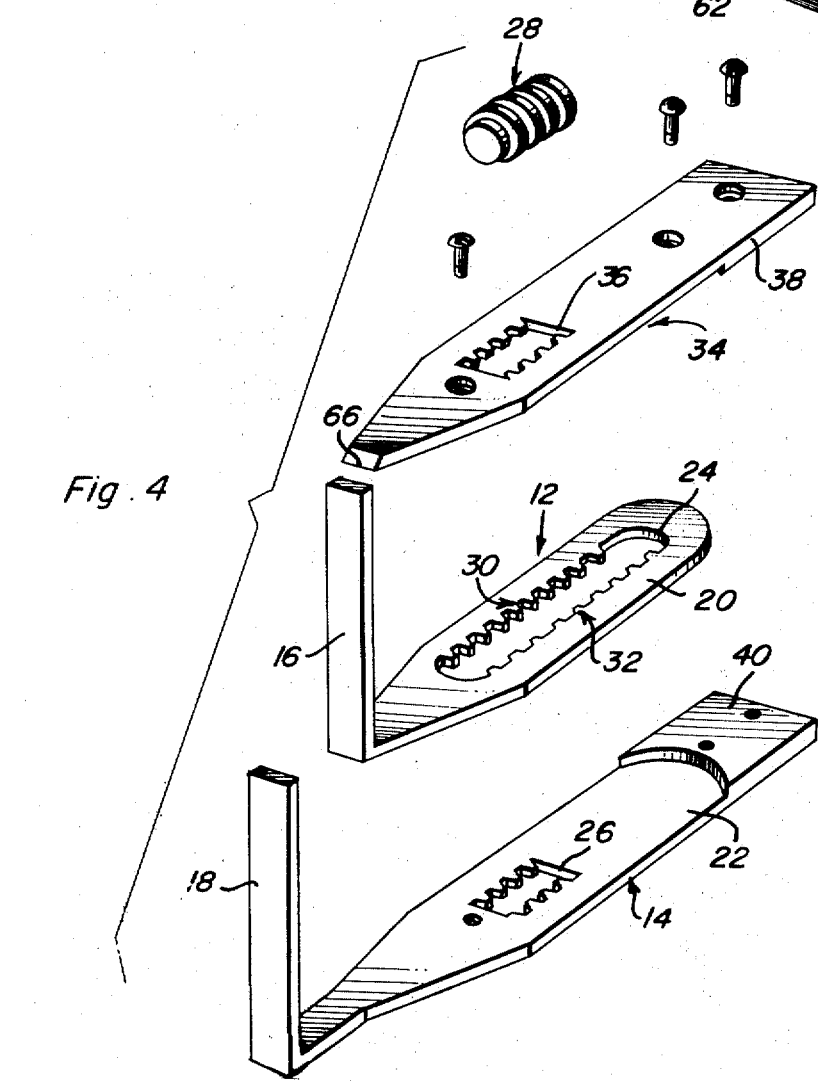
FIG. 4 is an exploded, perspective view showing the instrument of FIGS. 1 and 2, but with the impression-taking attachments removed.
Figure 7:
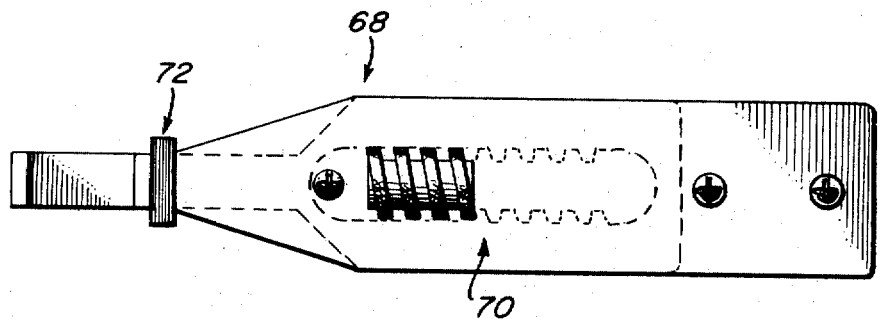
FIG. 7 is a top plan view showing an alternative embodiment of a caliper device according to the present invention.
Figure 10:
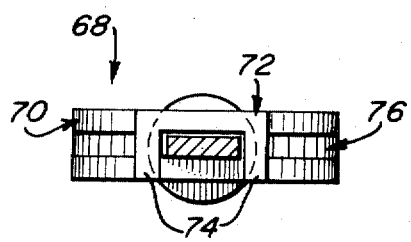
FIG. 10 is a sectional view, taken generally along the line 10—10 of FIG. 9.
Figure 9:
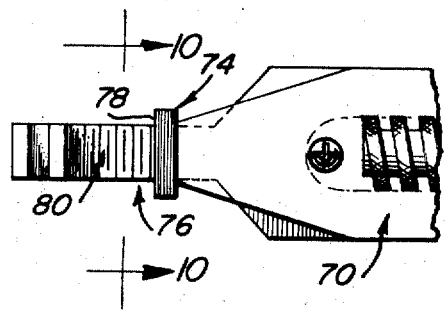
FIG. 9 is a fragmentary, top plan view, similar to FIG. 7, but showing various ones of the elements in a moved position.
Figure 8:
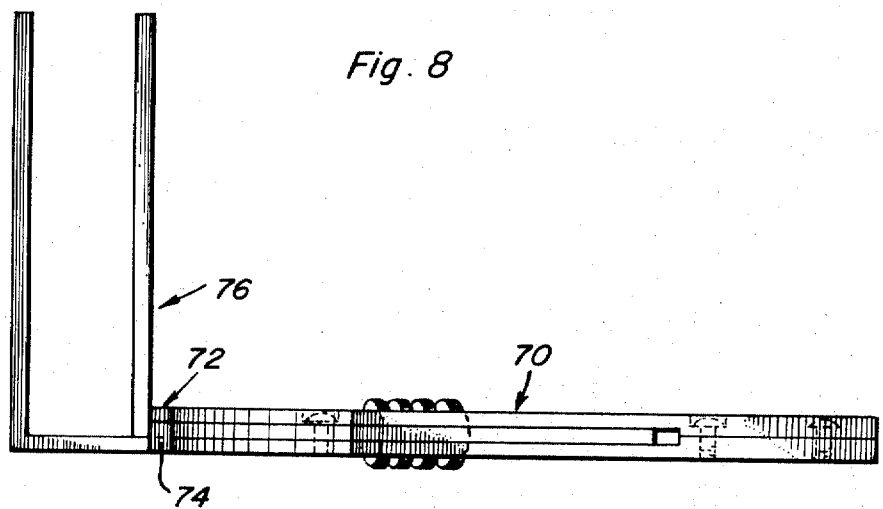
FIG. 8 is a side elevational view showing the caliper device of FIG. 7.

Referring now to FIGS. 5 and 6 of the drawings, attachments 42 and 44 may be arranged on portions 16 and 18 of elements 12 and 14 for taking an impression of an object, such as a nasal septum. Since attachments 42 and 44 are identical in construction, only one of the attachments is described in detail herein. Each attachment 42, 44 has a pair of parallel walls 46 and 48 and a web 50 connected to and arranged extending between walls 46 and 48 for cooperating with same for forming a channel disposed for receiving an impressionable material 52 (FIG. 2) therein. A suitable, known putty, and the like, may be used for the material 52. Flanges 54 are provided on walls 46 and 48, and are arranged extending parallel to web 50 and toward one another for embracing an associated element portion 16, 18. By this arrangement, attachments 42, 44 may be easily placed on and removed from the element portion 16, 18.

Web 50 is provided with an extension 56 curved in a plane parallel to walls 46, 48. Continuations 58 and 60 of walls 46 and 48 extend along the web extension 56, and a lip 62 is arranged between continuations 58, 60 adjacent the free end of extension 56 for forming a separator arrangeable at a lower portion of a nasal septum. The latter can easily be seen from FIG. 2 of the drawings.

The extent of a nasal septum, or other object, is indicated as a function of setting element 16, 18 by graduations in indicia provided on part 20 of element 12 adjacent portion 16 of that element. These graduations and indicia form a scale 64, best seen from FIG. 3 of the drawings. Plate 34 is provided with an edge 66 arranged for cooperating with scale 64 and permitting one to read-off an extent of an object being measured.

FIGS. 7 to 10 of the drawings show an instrument 68 according to the present invention which is also in the form of a caliper device similar to device 10. Accordingly, only those elements necessary to explain the differences between instrument 68 and caliper device 10 will be referred to herein and designated by reference numerals in the drawings. Instrument 68 has a plate 70 provided with an enlargement 72 having projections 74 arranged for laterally guiding a movable element 76, which has a slightly different configuration in plan from element 12, and forming an edge 78 permitting one to read-off an extent of an object being measured. Instrument 68 is advantageous in that projections 74 afford a more rigid construction than that of caliper device 10.

As can be readily understood from the above description and from the drawings, an instrument according to the present invention permits the necessary measurement and impression taking for making a nasal filter, and the like, to be quickly, easily, and accurately taken. The scale 80 on the movable element, moreover, may be calibrated for both taking the measurement and impression simultaneously, or the measurement and impression may be made sequentially.

It is also to be understood that a caliper device according to the present invention may be used in any application in which such devices are conventionally employed, and is not necessarily limited to the taking of measurements and impressions of nasal septums.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A caliper device, comprising, in combination:
   a. means for corresponding to an extent of an object, the extent corresponding means including:
      i. a pair of elements having parallel portions in the form of jaws arranged for bracketing an object;
      ii. means for adjusting the spacing between the element portions; and
      iii. means for taking an impression of a nasal septum, the impression taking means including a pair of attachments, each mounted on a respective one of the elements and having a pair of parallel walls and a web connected to and arranged extending between the parallel walls and cooperating with the same for forming a channel arranged for receiving an impressionable material therein, the portions of the elements being planar, and flanges being provided on the attachment side walls and arranged extending parallel to the web and toward one another for embracing an associated element portion; and
   b. means for indicating the extent of the object as a function of the extent corresponding means.

2. A structure as defined in claim 1, wherein the web is provided with an extension curved in a plane parallel to the side walls, continuations of the side walls extend along the web extension, and a lip is arranged between the side wall continuations adjacent the end of the web extension for forming a separator arrangeable at a lower portion of a nasal septum.

3. An instrument for taking impressions of a septum, comprising, in combination:
   a. means for bracketing a nasal septum, the bracketing means including a pair of planar jaw-forming elements adjustable with respect to one another; and
   b. means associated with the bracketing means for taking an impression of the nasal septum, the impression taking means including a pair of attachments, each mounted on a respective one of the elements and having a pair of parallel, planar walls and a web connected to and arranged extending between the parallel walls and cooperating with same for forming a channel arranged for receiving an impressionable material therein, and flanges being provided on the attachment side walls and arranged extending parallel to the web and toward one another for embracing an associated element of the bracketing means.

4. A structure as defined in claim 3, wherein the web is provided with an extension curved in a plane parallel to the side walls, continuations of the side walls extend along the web extension, and a lip is arranged between the side wall continuations adjacent the end of the web extension for forming a separator arrangeable at a lower portion of a nasal septum.

* * * * *